United States Patent [19]
Lentz

[11] Patent Number: 5,440,746
[45] Date of Patent: Aug. 8, 1995

[54] SYSTEM AND METHOD FOR SYNCHRONIZING PROCESSORS IN A PARALLEL PROCESSING ENVIRONMENT

[75] Inventor: Derek J. Lentz, Los Gatos, Calif.

[73] Assignee: Seiko Epson Corporation, Tokyo, Japan

[21] Appl. No.: 972,699

[22] Filed: Nov. 6, 1992

[51] Int. Cl.[6] .............................................. G06F 15/16
[52] U.S. Cl. ............................. 395/163; 364/DIG. 1;
364/229; 364/230; 364/230.2; 364/231.5;
364/231.6; 364/239.6; 364/241; 364/245.5;
364/246; 395/290; 395/650; 395/726
[58] Field of Search ............... 395/725, 325, 275, 200,
395/425, 160, 161, 162, 163; 364/134

[56] References Cited

U.S. PATENT DOCUMENTS

| | | | |
|---|---|---|---|
| 4,380,798 | 4/1983 | Shannon et al. | 395/725 |
| 4,393,459 | 7/1983 | Huntley et al. | 395/725 |
| 4,574,350 | 3/1986 | Starr | 395/725 |
| 4,594,657 | 6/1986 | Byrns | 395/725 |
| 4,665,484 | 5/1987 | Nanba | 395/650 |
| 4,780,822 | 10/1988 | Miller | 395/425 |
| 4,847,754 | 7/1989 | Obermarck et al. | 395/650 |
| 4,903,218 | 2/1990 | Longo et al. | 395/163 |
| 4,928,222 | 5/1990 | Vriezen et al. | 395/650 |
| 4,928,247 | 5/1990 | Doyle et al. | 395/160 |
| 4,949,248 | 8/1990 | Caro | 395/725 |
| 4,965,718 | 10/1990 | George et al. | 395/425 |
| 4,975,833 | 12/1990 | Jinzaki | 395/425 |
| 5,081,702 | 1/1992 | Hamdan | 395/725 |
| 5,129,085 | 7/1992 | Yamasaki | 395/650 |
| 5,129,089 | 7/1992 | Nielsen | 395/725 |
| 5,142,676 | 8/1992 | Fried et al. | 395/425 |
| 5,155,499 | 5/1992 | Stiffler et al. | 395/425 |
| 5,167,028 | 11/1992 | Shires | 395/725 |
| 5,265,203 | 11/1993 | Peaslee et al. | 395/162 |
| 5,291,608 | 3/1994 | Flurry | 395/725 |

FOREIGN PATENT DOCUMENTS

0049158A3 4/1982 European Pat. Off. .
0442717A2 8/1991 .

*Primary Examiner*—Jack B. Harvey
*Assistant Examiner*—Ayaz R. Sheikh
*Attorney, Agent, or Firm*—Sterne, Kessler, Goldstein & Fox

[57] ABSTRACT

System and method for synchronizing the operation of a plurality of processor devices wherein a host processor does not have to continuously poll a status register to determine the availability of a shared resource. The host processor instructs a slave peripheral processor to perform a task requiring the use of a shared resource having a corresponding signal location. The host processor further instructs the slave peripheral processor to update the corresponding signal location to a specified value when the shared resource is no longer required. The host processor also sets the corresponding signal location to an initial value indicating that the slave peripheral processor still requires the use of the shared resource. The host processor then begins polling the signal location to determine if the slave peripheral processor no longer requires the shared resource. This determination is based on the presence in the corresponding signal location of the specified value. When the host processor detects the specified value in the signal location, the host processor frees the shared resource for use by other tasks. The host processor only begins polling the signal location after the corresponding shared resource is designated for use by a slave peripheral processor and no longer needed by a client process and after the host processor has another use for the shared resource.

21 Claims, 3 Drawing Sheets

SYSTEM AND METHOD FOR SYNCHRONIZING PROCESSORS IN A PARALLEL PROCESSING ENVIRONMENT

BACKGROUND OF THE INVENTION

1. Field of the Invention

The present invention relates generally to synchronization of processors, and more particularly to synchronization for control of one processor by another, and still more particularly to synchronization for control of a slave peripheral processor by a host digital processor.

2. Related Art

In recent years, advances in speed and density of integrated circuit devices has led to similar advances in speed and computing power of processor devices. With these advances came a widespread use of processors in numerous applications. As an example of the increased usage of processors, consider the case of peripheral devices. Prior to the advent of low cost, powerful processors, peripheral devices had no processing capacity of their own. Such devices were merely capable of responding to specific instructions from a host processor. With the advances described above, peripheral devices that utilize their own internal processors to achieve enhanced functionality are now available. Such peripheral devices are generally referred to as 'smart' peripherals.

When a computing system is provided with a smart peripheral, there is an interaction between the system's host processor and the peripheral's processor that can be described as a typical parallel processing relationship. In a parallel processing system, multiple processors are interfaced in such a manner as to allow each to perform separate computing tasks, wherein each task is a subset of a larger, parent task. In the case of a smart peripheral, the peripheral processor carries out tasks that are a subset of the computing system's task. The host processor is responsible for controlling and synchronizing the activities of the peripheral processor.

Parallel processing systems often employ common memory, common I/O, and common busses that are shared by each of the processors. This too is the case for parallel processing with a peripheral processor. Sharing of such resources among multiple processors requires synchronization of the operations of each processor with respect to every other processor.

With smart peripherals, the host processor may provide a variable number of operations for the peripheral processor to execute. Each of these operations may take a different amount of time to complete. To ensure that system resources and the peripheral processor itself are used in an efficient manner, the peripheral processor is synchronized by the host processor. Without such synchronization, the host processor and the peripheral processor(s) lack the coordination necessary to determine when each can use a portion of the shared memory, or when each may have access to a shared bus.

In conventional parallel processing systems, two general methods are provided for utilizing shared resources. The first method involves interrupts, or polling of a status register, or a combination of these techniques. In polling, to determine when a resource (e.g. a bitmap in shared memory) is no longer required, or when a set of operations is complete, the processor repeatedly reads (polls) a status register. This polling continues until a specific event is detected in the status register indicating the availability of the shared resource. Such polling is done continuously and consumes a large amount of bus bandwidth and requires a substantial amount of processor time. Polling is therefore inefficient. For interrupt systems, a large amount of host processor context switch overhead is involved.

The second method of utilizing shared resources is that of using memory semaphores. Semaphores are flag variable devices that indicate whether a shared resource can be accessed. In semaphore systems a particular message code, or semaphore, is placed in a particular memory location corresponding to the shared resource. The code notifies other processors of the status of the resource. In systems employing memory semaphores, a processor that is waiting on the availability of a particular resource (e.g. a shared memory region) must read the memory location containing the code relating to the status of that resource. If the semaphore indicates the resource is unavailable, the processor enters a wait state. The wait state is punctuated by periodic re-readings of the memory semaphore. The status of repeated waits and reads is known as a "spin lock."

Thus in systems employing semaphore techniques, a specified memory location is used as a flag to indicate that something has completed or needs attention. Semaphores require uninterrupted read-modify-write capabilities in the memory system. The mason an uninterrupted read-modify-write capability is required will now be described. In conventional systems using semaphores to control multiple processors, a type of processor race condition can occur. If a processor is polling a semaphore location to determine resource availability it first reads that location. If the location contains a value indicating that the resource is busy, the processor continues periodic polling. If, however, the location contains a value indicating that the resource is available, the processor must now modify the value and then write the modified value to the semaphore location.

This technique, by itself, leads to problems when multiple processors are polling the semaphore location in the same time frame. If a first processor, as described above, reads the location and proceeds to modify and write the modified value to that location, a second processor must be inhibited from doing the same as soon as the first processor has read the value. If the second processor is not inhibited, both processors will read the value indicating resource availability, both will believe they can access that resource, and both will attempt to modify that value and write to that memory location.

The conventional technique used to overcome this problem is to inhibit processor interruptions during the entire read-modify-write operation. In this manner, if the host (master) is not capable of being interrupted during these operations, a second processor cannot attempt to claim a shared resource that is being claimed by a first processor. Such a system of allowing uninterruptible read-modify-write capabilities leads to inefficient processor utilization.

What is needed, then, is a system and method for controlling the use of slave peripheral processors without inhibiting interrupts to the host processor during the read-modify-write sequence.

What is further needed is an efficient method of determining when a parallel processor no longer requires the use of a shared resource. What is needed is a method that does not continuously poll status registers or require uninterrupted read-modify-write capabilities.

SUMMARY OF THE INVENTION

The present invention is directed to a system and method of synchronizing slave peripheral processors and their use of shared resources. A host processor, in executing a user process, determines that an operation is to be performed requiring processing operations by a slave peripheral processor. The host processor also determines that a shared resource must be utilized by the slave peripheral processor in carrying out this task.

The host processor designates a location in memory to act as a signal location. The signal location is set up to hold a flag indicating the availability of the shared resource. The host processor initializes this location to a value indicating that the shared resource is unavailable. For each shared resource required, an associated signal location is designated. Thus the use of multiple shared resources can be controlled.

The host processor then instructs slave peripheral processor to carry out the designated task. The slave peripheral processor is assigned the shared resource to use in executing the task.

The slave peripheral processor is also instructed to store a specified status value in the signal location corresponding to the shared resource used in executing the task. The specified value replaces the initial status value and is to be stored in the appropriate signal location only after the slave peripheral processor no longer needs the associated shared resource in executing the task. Presence, then, of the specified value in the signal location indicates that the associated shared resource is free for other uses.

The host processor begins polling the signal location to determine if the slave peripheral processor no longer requires the use of that signal location. The host processor does not begin polling until two events occur. The host processor does nothing until: (1) it requires use of the shared resource for another task; and (2) the user process indicates that it no longer needs that shared resource.

After these two events occur, the host processor polls the signal location associated with the assigned shared resource on a periodic basis. The polling is done to determine if the shared resource is available for other uses or if it is still required by the slave peripheral processor for the assigned task. If a signal location still contains the initial status value, the associated shared resource is still required by the slave peripheral processor. If, on the other hand, a signal location contains the specified value, the associated shared resource is available for use in other tasks.

In a system where multiple shared resources (or groups of shared resources) are designated for use by a slave peripheral processor, multiple signal locations are created. Each shared resource (or group of shared resources) is designated a corresponding signal location. At the commencement of a designated task, the host processor loads the initial value into each of these signal locations. The host then polls each of these locations individually once the above two conditions have been met for each location to determine the availability of the shared resources on an individual basis.

A key feature of the present invention is that the host processor only needs to designate a signal location when a shared resource is designated to be used by a slave processor.

A further feature of the invention is that the host processor only needs to begin polling the signal location when the host requires that resource for another task and the user process (or application) using that resource no longer requires that resource. Thus, the host processor does not continuously poll the signal location.

Since the slave peripheral processor is only using resources specified by the host processor, the host can pre-set memory locations to known values. When the host needs to know when a resource or set of resources is no longer needed, such as for memory "garbage collection" or dynamic paging of memory data to disk, it allocates a location in memory as a signal location. A signal location is thus polled only when the associated shared resource is assigned to a slave peripheral processor, and when the resource is needed by the host processor for another task.

Memory garbage collection refers to sorting and reallocating information stored in memory to de-fragment that memory. In advanced operating system environments, memory is allocated and de-allocated for different purposes as needed. Because memory is allocated in "chunks," memory often becomes fragmented. Often, this results in pieces of related information stored in different areas of memory. Garbage collection refers to sorting and reallocating memory more efficiently so that memory is no longer fragmented. This is important especially where system hardware cannot use fragmented memory.

Another feature of the present invention is that continuous read-modify-write capabilities are not required. According to the present invention, the host processor first initializes the designated signal location. This is a write only step. After it is initialized, the slave processor only needs to write to the location and the host processor only needs to read the location. No processor is performing a read-modify-write sequence at any time.

A further feature of the present invention is that a graphics processor (slave peripheral processor) can be used to draw into system memory using standard graphics instructions. The graphics processor can modify a word in system memory as if that word were part of a pixmap. Using the present invention, a region in system memory can be allocated to the graphics processor for such a use. This allows the graphics processor to use existing drawing operations to draw on system memory.

Further features and advantages of the present invention, as well as the structure and operation of various embodiments of the present invention, are described in detail below with reference to the accompanying drawings.

BRIEF DESCRIPTION OF THE DRAWINGS

In the drawings, like reference numbers indicate identical or functionally similar elements. Additionally, the left-most digit of a reference number identifies the drawing in which the reference number first appears.

DETAILED DESCRIPTION OF THE INVENTION

1. Overview and Discussion of the Invention

The present invention is directed to a system and method for synchronizing the control of a slave peripheral processor by a host (master) processor in a parallel processing environment. More specifically, the present invention has been developed for controlling a VLSI (very large scale integration) graphics processor.

According to the present invention, the slave peripheral processor is under the control of the host processor. The host processor controls when the slave peripheral processor can perform operations requiring the use of a shared resource—typically a memory location or a graphics object described by a pixmap stored in a series of memory locations such as a frame buffer. Thus, the host processor can control when the shared resource is accessed and modified and when the slave peripheral processor can access and modify it. As a result, continuous polling and uninterrupted read-modify-write capabilities, as required by conventional techniques, are not required.

Figure 1:
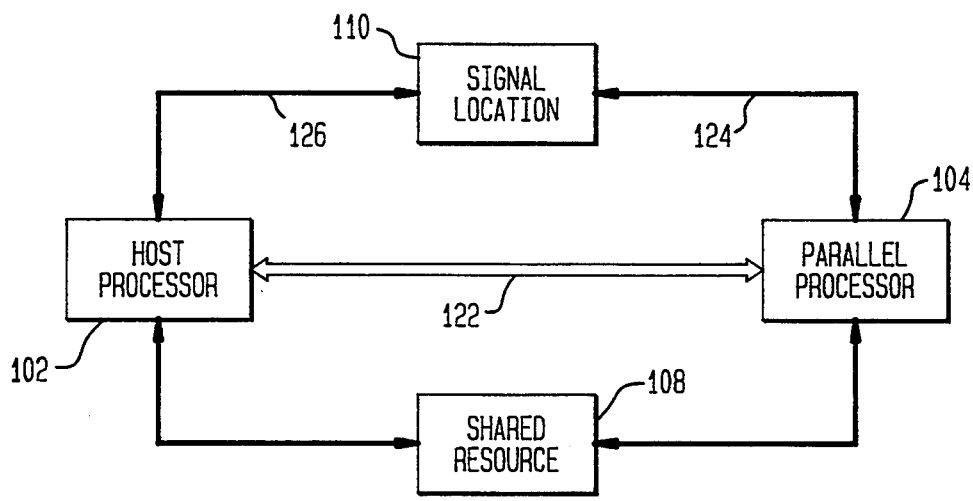
FIG. 1 is a high level block diagram illustrating the invention in an environment having a host processor and a peripheral processor.

FIG. 1 is a high level block diagram illustrating the invention in an environment having a host processor and a slave peripheral processor. Referring to FIG. 1, a host processor 102 shams computing responsibilities with a slave peripheral processor 104. Host processor 102 and slave peripheral processor 104 sham a shared resource 108. Shared resource 108 is typically a pixmap residing in a system memory, or more specifically, a graphics object stored in those memory locations. Note that shared resource 108 could be any resource to be shared between host processor 102 and slave peripheral processor 104, or a plurality of slave peripheral processors 104.

A signal location 110 is associated with each shared resource 108 and is provided to hold a status value indicating the availability of shared resource 108. Additionally, signal location 110 can be associated with a group of shared resources 108. In a preferred embodiment, signal location 110 is designated as a location in system memory. In alternative embodiments, signal location 110 could be a location in off-screen memory of the system frame buffer. This alternative is less efficient.

Signal location 110 is a location in memory designated at the time each task is assigned to a slave peripheral processor. This method allows maximum memory utilization flexibility. In an alternative embodiment, signal locations could be established for each shared resource up-front, at the time overall system memory allocation occurs.

Figure 2:
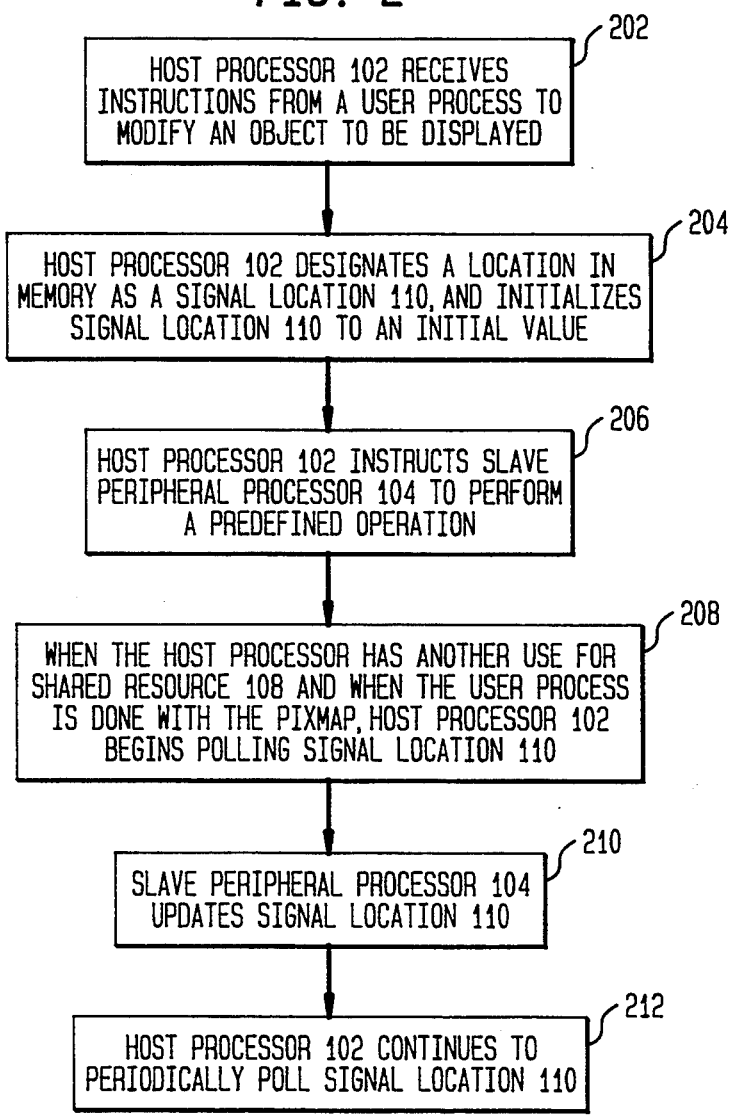
FIG. 2 is a flow chart illustrating the method of processor synchronization according to the present invention.

FIG. 2 is a flow chart illustrating the operation of the present invention. Referring to FIGS. 1 and 2, the operation of the present invention will be generally described.

In this patent document, the term pixmap refers to a rasterized image stored in memory, wherein each pixel of the image comprises a single bit or a set of bits. When each pixel comprises only a single bit, the pixmap can be referred to as a bitmap. For each display pixel, a plurality of bits are designated to store digital information comprising display characteristics such as color (e.g. red/green/blue), intensity, clipping (for windows), and depth (for 3D graphics).

A user process (not shown), such as an application program, running in the processor system, requires that an object be generated or modified (generally referred to as modified in this document in a window on a display screen. The user process directs the host processor to modify the object per instructions. The object is represented by a pixmap located in a region of system memory. In this example, the pixmap is shared resource 108.

In raster graphics systems, a digital bitmap of each display screen is stored in a frame buffer. For each of the display pixels, a plurality of bits are designated to store digital information comprising display characteristics such as color (e.g. red/green/blue), intensity, clipping (for window ID's), and depth (for 3D graphics). Thus, for each frame buffer, a block of frame buffer memory is set aside for use by slave peripheral processor 508.

The user process is done with the object when the user process no longer requires the object to be displayed in the window, when the window is no longer to be displayed, or when the user process is ready to allow another process to modify the object. When the user process is done with the object it informs the host processor. At this time, user process no longer cares what is done with respect to the object and hence what is done with shared resource 108.

In a step 202, host processor 102 receives instructions from a user process to modify an object to be displayed. The object is a pixmap residing in the system frame buffer.

In a step 204, host processor 102 designates a location in memory as a signal location 110 to correspond to shared resource 108 (the pixmap) that is to be modified by slave peripheral processor 104. Host processor also initializes this signal location 110 to an initial value that is a known state (e.g., all zeros).

In a step 206, host processor 102 passes a command along bus 122 instructing slave peripheral processor 104 to perform a predefined operation. The predefined operation requires use of shared resource 108. Host processor 102 also commands slave peripheral processor 104 to modify signal location 110 to a specified value when the operation is complete, or when shared resource 108 is no longer needed by slave peripheral processor 104.

As an example, consider the operation of updating an object drawn in a window on a display terminal. The object in this example is a pixmap of a raster image held in a region of system memory. Host processor passes a command to slave peripheral processor 104 to perform the graphics operation. Host processor 102 instructs slave peripheral processor 104 that the object to be updated resides in a specific memory location range. Additionally, host processor 102 needs to know when slave peripheral processor 104 has completed the operation. Therefore, host processor 102 instructs slave peripheral processor 104 to update signal location 110 associated with the pixmap.

In a step 208, when the host processor has another use for shared resource 108 and when the client process is done with the pixmap (as described above), host processor 102 begins polling signal location 110 periodically. In an embodiment of the invention, such polling is performed at regular, periodic intervals.

The reason host processor 102 does not begin polling signal location 110 sooner is that until these two conditions have occurred, there is no other need for shared resource 108. Thus, host processor is not unnecessarily polling signal location 110 and consuming bus bandwidth and processor operations.

In polling signal location 110, host processor 102 is attempting to determine whether slave peripheral processor 104 no longer needs to use shared resource 108. If signal location 110 contains the known state as initialized by host processor 102 in step 204, slave peripheral processor 104 still needs use of shared resource 108 and the operation continues at a step 210.

If, however, signal location 110 contains the specified value to which slave peripheral processor 104 was instructed to update upon completion of the operation, then host processor 102 knows shared resource 108 is available for other uses, and the process is complete.

In step 210, when slave peripheral processor 104 finishes the operation and no longer needs shared resource 108, slave peripheral processor 104 updates signal location 110 to the value specified by host processor 102 in step 202.

In a step 212, host processor 102 continues to periodically poll signal location 110 to determine if shared resource 108 is no longer needed by slave peripheral processor 104. Since slave peripheral processor 104 finished the operation in step 208 and updated signal location 110 as instructed in step 202, the next subsequent poll of signal location 110 by host processor 102 reveals that shared resource 108 is no longer needed by slave peripheral processor 104.

Since host processor 102 controls the time at which it needs shared resource 108 and it knows when the user process is no longer needs the shared resource, and since host processor 102 controls when slave peripheral processor 104 can access shared resource 108, host processor 102 does not have to continuously poll signal location 110.

The scenario discussed with reference to FIGS. 1 and 2 above was presented in terms of a single slave peripheral processor 104, a single shared resource 108 and a single signal location 110. It will be obvious to one of ordinary skill in the art how the present invention can be expanded to systems having more than one slave peripheral processor 104, and/or more than one shared resource 108 and signal location 110.

Additionally, the present invention is useful when implemented in a pipeline system capable of out-of-order instruction. Such an implementation is discussed in greater detail below.

2. Example Implementation

Contemporary graphics computing systems provide an environment wherein multiple client processes (applications) can run simultaneously. The client processes may each generate a graphics image and can display that image to a portion of the display. Typically, a windowing technique is provided, wherein a defined portion of the display (a window) is designated for a client process to display its image.

Additionally, each client process may generate multiple images, both two and three dimensional, and display these images in multiple windows.

To obtain processing efficiencies required to generate 3D graphics images for multiple client processes, graphics systems use pipelining techniques and a technique called "context switching" or "task switching" for switching between multiple pipelines. Because the graphics processor can switch pipelines (stop processing one pipeline and begin processing another), the host cannot simply set a timer to determine when the slave will complete a particular operation.

Figure 3:
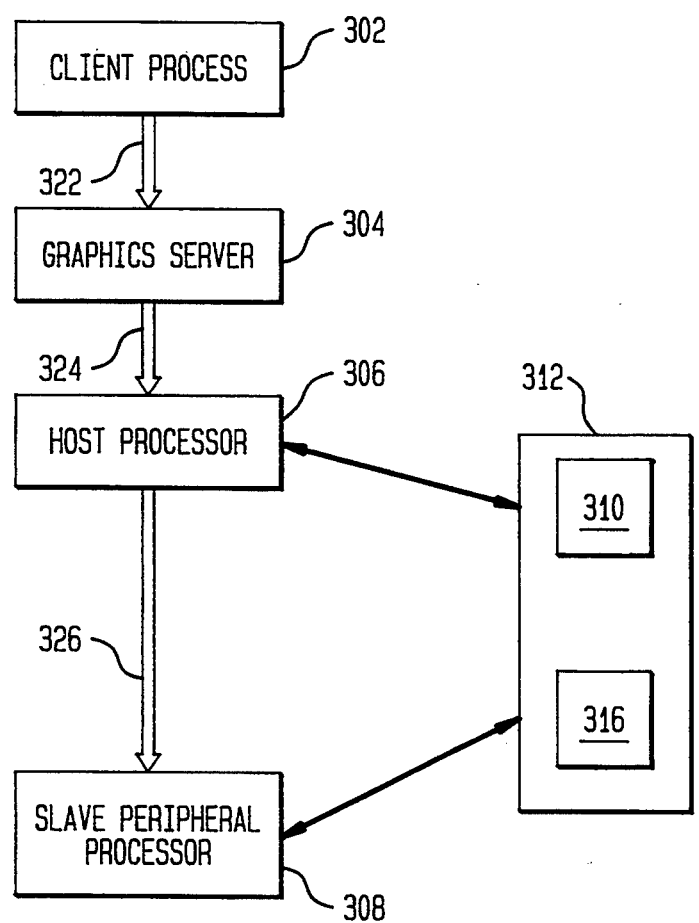
FIG. 3 is a block diagram of an example implementation of the present invention using a graphics processor as a parallel processor.

FIG. 3 is a block diagram illustrating such a graphics system. Referring to FIG. 3, a client process 302 runs in the operating system environment of the computer system. Client process generates graphics images.

Multiple client processes 302 may exist concurrently. In this case, each client process 302 is capable of generating a graphics image to be displayed in a window on the display monitor.

Client process sends a stream 322 of commands (instructions or requests) and data (referred to as 'command stream 322') to a graphics server 304 (or graphics driver). Graphics server 304 is a control process that manages client process 302 requests and controls the display hardware for multiple clients. Graphics server 304 is implemented such that it is capable of managing multiple client processes 302. Client process 302, command stream 322, and graphics server 304 are well known in the art. An example of graphics server 304 is the X server in an X windows system.

A host processor 306 is also provided. Host processor 306 is capable of executing instructions received from graphics server 304. These instructions are received via signal path 324.

In response to graphics server 304, host processor 306 sends a pipeline 326 of instructions to a slave peripheral processor 308. Host processor 306 may send multiple streams of pipelined instructions to slave peripheral processor 308. These instructions tell peripheral processor 308 to generate or modify a graphics object as required by multiple client processes 302 or as required by multiple slaves 308 that operate in parallel.

Multiple slave peripheral processors 308 may be provided to generate and modify graphics objects. It will be clear to one of ordinary skill in the art how the present invention is used in such an alternative environment.

The images drawn under the direction of client process 302 are rasterized objects stored as pixmaps 310. The pixmaps 310 are stored in system memory 312.

A location in system memory 312 is used by host processor 306 for designating signal locations 316 associated with the pixmaps 310. Each pixmap 310 is provided with an associated signal location 316.

In operation, the client processes require that an object is to be drawn in a window on a display terminal. The client process sends command stream 322 to graphics server 302. Graphics server 302 receives multiple command streams 322 from the various client processes that may be running. Command stream 322 is a pipelined stream of commands.

Graphics server 304 manages the tasks requested by client processes 302.

Graphics server 304 sends instructions to host processor 306. The instructions are for carrying out the tasks required by client processes 302. Host processor 306 interprets the instructions to carry out the task of drawing the objects as required by client processes 302.

Host processor 306 uses slave peripheral processors 308 (VLSI graphics processors) to perform the actual graphics operations of generating and/or modifying the graphics object described by pixmap 310. Host processor 306 designates an area in system memory 312 as the pixmap 310 for each object to be generated and/or modified. For multiple objects, multiple pixmaps 310 are often used.

The invention keeps track of which pixmaps are dedicated for use by a slave peripheral processor 308 and determines when a pixmap 310 is available.

In advanced graphics systems, multiple slave peripheral processors 308 are employed to generate and/or modify multiple pixmaps 310. These advanced systems often use pipelined slave peripheral processors 308 and a pipelined host processor 306. Slave peripheral processor 308 can use context switching to change from one pipeline to another.

Because slave peripheral processor 308 can context switch, the host processor 306 does not necessarily know when slave 308 is done with the object. Therefore a technique is provided whereby host processor 306 determines when slave peripheral processor 308 executes the last instruction, modifying the object.

Figure 4:
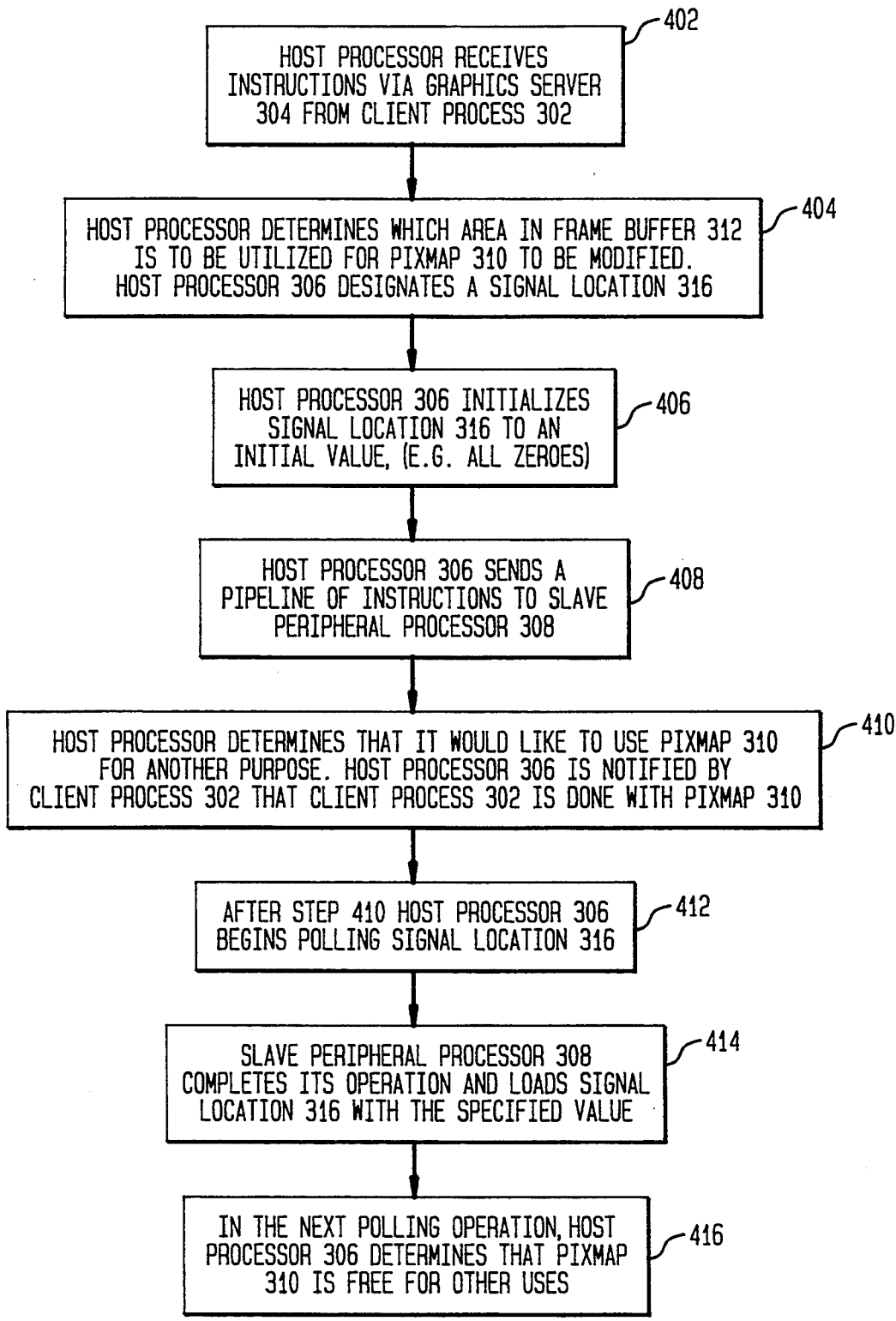
FIG. 4 is a flow chart illustrating the method of processor synchronization according to the example implementation illustrated in FIG. 3.

FIG. 4 is a flow chart illustrating the operation of the invention in the environment of FIG. 3. Referring to FIGS. 3 and 4, the invention in this environment will now be described. In a step 402, host processor receives instructions via graphics server 304 from client process 302.

In a step 404, host processor determines which area in system memory 312 is to be utilized for pixmap 310 to be modified. Host processor 306 designates a signal location 316 in system memory 318. Signal location 316 represents pixmap 310 and can be as small as a single bit.

In a step 406, host processor 306 initializes signal location 316 to an initial value (e.g. all zeros). This initial value indicates that pixmap 310 is dedicated for use by slave peripheral processor 308.

In a step 408, host processor 306 sends a pipeline of instructions to slave peripheral processor 308. If multiple slave peripheral processors 308 are utilized, each may receive a pipeline of instructions.

Included with these instructions are commands for drawing the object in pixmap 310, and a command telling slave peripheral processor to load a specified value into signal location 316 when slave peripheral processor 308 no longer needs to write to pixmap 310.

The specified value (e.g. all ones) indicates to host processor 306 that slave peripheral processor no longer needs pixmap 310.

In a step 410, host processor eventually determines that it would like to use the memory 312 required by pixmap 310 for another purpose. A number of means can be employed for making this determination. For example, the host processor, through a virtual memory controller, may allocate that specific portion of memory for another purpose.

Also in step 410, host processor 306 determines that client process 302 is done with pixmap 310. For example, one means for making this determination may be host processor's 306 receipt and interpretation of a command from client process 302 indicating that it no longer needs pixmap 310. As an alternative example, graphics server 304 may determine that the memory location is required to create a new pixmap and thus reallocate the memory location and inform host processor 306.

In a step 412, after step 410, host processor 306 begins polling signal location 316. The polling is done at regular periodic intervals. Host processor 306 is polling to determine whether signal location 316 contains the specified value (i.e. to determine whether slave peripheral processor 308 no longer needs pixmap 310). Note that step 412 does not occur until after both conditions of step 410 are met.

In a step 414, slave peripheral processor 308 completes its operation and loads signal location 316 with the specified value.

In a step 416, in the next polling operation, host processor 306 determines that pixmap 310 is free for other uses.

According to the invention, neither continuous polling nor uninterrupted read-modify-write capabilities are required. Since host processor 306 does not begin polling until after the two conditions of step 410 are met, host processor 306 does not waste valuable time polling signal location 316 needlessly.

Additionally, since host processor only has to read signal location 316 (once initialized) and slave peripheral processor 308 only has to write to signal location 316, both processors can continue to handle interrupts throughout execution.

3. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for allowing a host processor to control the use of a shared resource when a slave peripheral processor executes an operation in a client process requiring the use of said shared resource, comprising the steps of:

(a) assigning a signal location in system memory for storing a value indicative of the availability of said shared resource;

(b) setting an initial value at said signal location indicating that the slave peripheral processor requires the use of the shared resource to perform said operation;

(c) instructing the slave peripheral processor to perform said operation in said client process requiring use of the shared resource;

(d) determining whether the host processor has another use for the shared resource other than said operation performed by the slave peripheral processor;

(e) determining whether the client process needs the shared resource for a further operation;

(f) updating the value at said signal location to a specified value when the slave peripheral processor no longer requires use of said shared resource in said operation; and (g) checking whether said specified value is in said corresponding signal location to determine if said slave peripheral processor no longer requires said shared resource, wherein said checking step is performed when the host processor is determined in said determining step (d) to have another use for the shared resource and the client process is determined in said determining step (e) to no longer need the shared resource.

2. The method of claim 1, further comprising the step of commanding the slave peripheral processor which specific shared resources of a group of shared resources are to be used to perform said operation in said client process.

3. The method of claim 1, further comprising the step of freeing said shared resource from use by the slave peripheral processor after said value updating step (f) when the slave peripheral processor no longer requires the use of said shared resource.

4. The method of claim 1, wherein said slave peripheral processor begins executing said operation after said instructing step (c), and wherein said updating step (f)

comprises the step of storing said specified value in said signal location when said shared resource is no longer required by said slave peripheral processor for executing said operation.

5. The method of claim 1, wherein said setting step (b) comprises writing said initial value at said signal location in system memory in accordance with a write instruction from said host processor and said updating step (f) comprises writing said specified value at said signal location in system memory in accordance with a write instruction from said slave peripheral processor, whereby said host processor can issue an interruptible sequence of instructions for reading, modifying, and writing said initial and specified values at said signal location in system memory.

6. A system for synchronizing use of a shared resource a host processor and by a slave peripheral processor when said slave peripheral processor uses said shared resource to perform an operation in a client process, comprising:
a system memory having a memory location for storing a value indicating the availability of said shared resource;
first means, coupled to said host processor, for determining whether said host processor requires said shared resource for another purpose other than said operation in said client process; and
second means, coupled to said host processor, for determining whether the client process needs the shared resource for a further operation;
wherein said host and slave peripheral processors are each coupled to said memory location,
said host processor stores an initial value at said memory location indicating that the slave peripheral processor requires use of said shared resource to perform said operation in said client process;
said slave peripheral processor stores a specified value at said memory location when said slave peripheral processor has finished using said shared resource in said operation in said client process;
and said host processor polls said memory location when said first means determines that said host processor requires said shared resource for another purpose other than said operation in said client process and when said second means determines that said client process does not need the shared resource for a further operation.

7. The system of claim 6, further comprising a graphic server, coupled to said host processor, configured to manage multiple client processes.

8. The system of claim 7, wherein said graphics server comprises an X server.

9. The system of claim 6, wherein said slave peripheral processor comprises a VLSI graphics processor.

10. The system of claim 6, wherein said shared resource comprises a pixmap.

11. The system of claim 6, wherein said shared resource comprises a buffer of instructions in a region of memory.

12. The system of claim 6, wherein said shared resource comprises a block of memory.

13. The system of claim 6, wherein said shared resource comprises a region of a system frame buffer.

14. A system for synchronizing use of a shared resource by a host processor and by a slave peripheral processor when said slave peripheral processor uses said shared resource to perform an operation in a client process, comprising:
a system memory having a memory location for storing a value indicating the availability of said shared resource;
a graphics server, coupled to said host processor, configured to manage multiple client processes and to provide instructions to said host processor regarding each of said multiple client processes;
first means, coupled to said host processor, for determining whether said host processor requires said shared resource for another purpose other than said operation in said client process performed by said slave peripheral processor; and
second means, coupled to said host processor, for determining when said client process no longer needs said shared resource for a further operation; and
a bus for communicating instructions from said host processor to said slave peripheral processor;
wherein:
said host and slave peripheral processors are each coupled to said memory location;
said host processor stores an initial value at said memory location indicating that the slave peripheral processor requires use of said shared resource to perform said operation in said client process and said slave peripheral processor stores a specified value at said memory location when said slave peripheral processor has finished using said shared resource in said operation in said client process;
and said host processor polls said memory location when said first means determines that said host processor requires said shared resource for another purpose other than said operation in said client process and when said second means determines that said client process does not need the shared resource for a further operation;
whereby, said host processor can receive an interrupt after storing said initial value and does not have to continuously poll said memory location.

15. The system of claim 14, wherein said slave peripheral processor comprises a VLSI graphics processor.

16. The system of claim 14, wherein said shared resource comprises a pixmap.

17. The system of claim 14, wherein said shared resource comprises a buffer of instructions in a region of memory.

18. The system of claim 14, wherein said shared resource comprises a block of memory.

19. The system of claim 14, wherein said shared resource comprises a region of a system frame buffer.

20. The system of claim 14, wherein said graphics server comprises an X server.

21. The system of claim 14, wherein said second determining means includes at least one of a means for receiving and interpreting a command in said client process which indicates that said client process no longer needs said shared resource and a means for receiving notification from said graphics server that said graphics server has reallocated said shared resource.

* * * * *